(12) United States Patent
Bai et al.

(10) Patent No.: US 9,975,781 B2
(45) Date of Patent: May 22, 2018

(54) SILICA SOLS, METHOD AND APPARATUS FOR PRODUCING THE SAME AND USE THEREOF IN PAPERMAKING

(71) Applicant: ECOLAB USA INC., St. Paul, MN (US)

(72) Inventors: Wen Bai, Shanghai (CN); Jian Xu, Shanghai (CN); Jia Wu, Shanghai (CN); Zhi Chen, Shanghai (CN); Jian Kun Shen, Shanghai (CN); Raymond D. Miller, Jr., Carol Stream, IL (US); Jane B. Wong Shing, Aurora, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days. days.

(21) Appl. No.: 15/105,801

(22) PCT Filed: Dec. 17, 2014

(86) PCT No.: PCT/US2014/070927
§ 371 (c)(1),
(2) Date: Jun. 17, 2016

(87) PCT Pub. No.: WO2015/095377
PCT Pub. Date: Jun. 25, 2015

(65) Prior Publication Data
US 2016/0311693 A1    Oct. 27, 2016

(30) Foreign Application Priority Data

Dec. 18, 2013  (CN) .......................... 2013 1 0697915
Dec. 10, 2014  (CN) .......................... 2014 1 0748835

(51) Int. Cl.
| | | |
|---|---|---|
| *D21H 21/10* | (2006.01) | |
| *C01B 33/146* | (2006.01) | |
| *D21H 17/68* | (2006.01) | |
| *B01J 13/00* | (2006.01) | |
| *D21H 11/02* | (2006.01) | |
| *C09C 1/30* | (2006.01) | |

(52) U.S. Cl.
CPC ............ *C01B 33/146* (2013.01); *B01J 13/00* (2013.01); *C09C 1/3045* (2013.01); *C09C 1/3063* (2013.01); *D21H 11/02* (2013.01); *D21H 17/68* (2013.01); *D21H 21/10* (2013.01)

(58) Field of Classification Search
CPC .... C09C 1/3045; C09C 1/3063; D21H 17/68; D21H 21/10; D21H 11/02; B01J 13/00
USPC ..................................................... 162/164.6
See application file for complete search history.

(56) References Cited

U.S. PATENT DOCUMENTS

| | | |
|---|---|---|
| 2,244,355 A | 6/1941 | Britner |
| 2,769,785 A | 11/1956 | Walker |
| 3,582,502 A | 6/1971 | Farrow et al. |
| 4,385,961 A | 5/1983 | Svending et al. |
| 4,753,710 A | 6/1988 | Langley et al. |
| 4,795,531 A | 1/1989 | Sofia et al. |
| 5,368,833 A | 11/1994 | Johansson et al. |
| 5,503,820 A | 4/1996 | Moffett et al. |
| 5,537,363 A | 7/1996 | Holcomb |
| 5,573,674 A | 11/1996 | Lind et al. |
| 5,643,414 A | 7/1997 | Johansson et al. |
| 5,853,616 A | 12/1998 | Moffett et al. |
| 6,372,089 B1 | 4/2002 | Keiser et al. |
| 6,372,806 B1 | 4/2002 | Keiser et al. |
| 6,486,216 B1 | 11/2002 | Keiser et al. |
| 6,603,805 B1 | 8/2003 | Hisano et al. |
| 2003/0065041 A1 | 4/2003 | Keiser et al. |

FOREIGN PATENT DOCUMENTS

| | | |
|---|---|---|
| EP | 0 041 056 A1 | 12/1981 |
| EP | 2 522 626 A1 | 11/2012 |
| WO | WO 86/00100 A1 | 1/1986 |
| WO | WO 86/05826 A1 | 10/1986 |
| WO | WO 96/30591 A1 | 10/1996 |
| WO | WO 97/16598 A1 | 5/1997 |
| WO | WO 2010/006994 A1 | 1/2010 |

OTHER PUBLICATIONS

International Search Report and Written Opinion of the International Searching Authority for corresponding International Patent Application No. PCT/US2014/070927 dated Apr. 29, 2015.
Iler, R.K. et al., "Degree of Hydration of Particles of Colloidal Silica in Aqueous Solution", *Journal of Physical Chemistry*, 60(7): 955-957 (1976).
Iler, R.K., "The Effect of Surface Aluminosilicate Ions on the Properties of Colloidal Silica[1]", *Journal Colloid and Interface Science*, 55(1): 25-34 (1976).
Extended European Search Report for Application No. 14871356.3 dated Apr. 24, 2017.

*Primary Examiner* — Mark Halpern
(74) *Attorney, Agent, or Firm* — Merchant & Gould P.C.

(57) ABSTRACT

The present invention relates to colloidal silicas having a low S-value and a high solids content, the preparation thereof, and the use thereof in the production of paper. When used in the production of paper, the colloidal silicas of the invention exhibit good retention and drainage performance so that they can be used in lower amounts compared to conventional colloidal silicas. The present invention also relates to an apparatus and a method for producing such activated colloidal silicas.

14 Claims, 5 Drawing Sheets

SILICA SOLS, METHOD AND APPARATUS FOR PRODUCING THE SAME AND USE THEREOF IN PAPERMAKING

This application is a National Stage Application of PCT/US2014/070927, filed 17 Dec. 2014, which claims benefit of Serial No. 201310697915.8, filed 18 Dec. 2013 in China and Serial No. 201410748835.5, filed 10 Dec. 2014 in China and which applications are incorporated herein by reference. To the extent appropriate, a claim of priority is made to each of the above disclosed applications.

TECHNICAL FIELD

The present invention relates to colloidal silicas having a low S-value and a high solids content, the preparation thereof, and the use thereof in the production of paper. When used in the production of paper, the colloidal silicas of the invention exhibit good retention and drainage performance so that they can be used in lower amounts compared to conventional colloidal silicas. The present invention also relates to an apparatus and a method for producing such activated colloidal silicas.

BACKGROUND ART

Colloidal silicas, also known as silica sols or silica hydrosols, are aqueous systems with very small silica particles which find use in a variety of fields, among other things dependent on the particle size. In the production of paper, silica based sols with very small, colloidal, anionic silica particles have found an increasing utilization during the last two decades. Colloidal silicas are hereby used as additives to the stock in combination with cationic or amphoteric polymers, mainly for improving retention and dewatering in the production of paper. The preparation and use of colloidal silicas are disclosed, for example, in European Patent 0041056, PCT Publication Nos. WO 86/00100 and WO 86/05826, U.S. Pat. Nos. 5,603,805, 6,372,089, and 6,486,216, the contents of all of which are incorporated herein by reference for all purposes.

The colloidal silicas useful in paper production are of the type which have discrete colloidal particles with a particle size usually of from about 4 to about 7 nm, a specific surface area of from about 300 to about 1000 $m^2/g$, and an S-value of from about 20 to about 40%. Colloidal silica products are commercially available from a variety of suppliers, for example, Nalco Chemical Company and EKA Nobel, AB.

For example, U.S. Pat. No. 5,603,805 discloses silica sols having an S-value within the range of from 15 to 40 percent comprising anionic silica particles, said silica particles being non-aluminum modified and having a specific surface area within the range of from 300 to 700 $m^2/g$. The silica sols disclosed in U.S. Pat. No. 5,603,805 have a $SiO_2$ content of from about 5 to 7.5 percent by weight.

At the present, methods for producing silica sols mainly utilize continuous producing methods. For example, U.S. Pat. No. 5,503,820 discloses a method for producing low concentration polysilicates microgels and the corresponding apparatus. In the apparatus of the said patent, a solution of water soluble silicate and a strong acid are supplied to a mixing device simultaneously. After the silicate is completely reacted with the strong acid in the mixing device, the resulting mixture is transported into a receiving tank. Meanwhile, water as a diluent is also supplied to the receiving tank, so that to dilute the resulting mixture to obtain a final diluted colloidal silica product. U.S. Pat. No. 5,853,616 also discloses a similar apparatus for producing colloidal silica.

Although above apparati may mix raw materials relatively uniform and can continuously produce colloidal silica products, but the quality of the products suffer instability. These products are unacceptable in terms of colloidal silica supplied for faster and greater paper making machine. In addition, in these production apparati, caustic sodium hydroxide is used to clean the reaction vessel each time after the reactions, which can cause corrosion of the reaction vessel, and can consequently increase the operation cost and bring environmental concerns.

There is still a need for a colloidal silica having a high solids content and a low S-value. In addition, while there are many multi-component programs used to improve retention and drainage performance in papermaking, there is still a need for new programs used to improve retention and drainage performance in especially the faster and bigger paper machines that are being built. Moreover, there is also a need for a new production apparatus which can stably produce activated colloidal silica having high solid content and low S-value, as well as having improved retention and drainage property.

SUMMARY OF THE INVENTION

An objective of the invention is to provide a colloidal silica having a high solids content and a low S-value.

Another objective of the invention is to provide a process for producing the colloidal silica according to the invention.

Another purpose of the present invention is to provide an apparatus for producing activated colloidal silica, wherein the apparatus comprises: a reaction vessel; a colloidal silica tank in fluid communication with the reaction vessel through a colloidal silica line for providing colloidal silica; an activating agent tank in fluid communication with the reaction vessel through an activating agent line for providing activating agent; and a terminator source for providing terminator through a terminator line.

Another purpose of the present invention is to provide a method producing activated colloidal silica by the apparatus for producing activated colloidal silica of the present invention, wherein the method comprises: starting the colloidal silica tank to supply colloidal silica to the reaction vessel through the colloidal silica line; starting the activating agent tank to supply colloidal silica to the reaction vessel through the activating agent line; contacting the colloidal silica with the activating agent for a time sufficient to convert the colloidal silica stock into activated colloidal silica; and starting the terminator source to supply the terminator through the terminator line to terminate the reaction.

Still another objective of the invention is to provide a method of using the colloidal silica according to the invention as a chemical additive in aqueous systems, particularly in the production of paper.

Yet still another objective of the invention is to provide a method for improving retention and drainage performance of a colloidal silica in the production of paper.

By utilizing the apparatus of the present invention for producing activated colloidal silica and the method for producing colloidal silica of the present invention, activated colloidal silica with stable quality can be obtained, which activated colloidal silica has high solid content and low S-value, providing improved retention and drainage property for paper making process.

At the same time, by utilizing the apparatus present invention for producing activated colloidal silica of the present invention, activated colloidal silica can be produced with a stable quality, and the apparatus can be conveniently connected to a downstream manufacture apparatus, such as a paper making machine, to thereby increase the overall production efficiency.

These and other embodiments of the invention will be apparent to those of skill in the art and others in view of the following detailed description of some embodiments. It should be understood, however, that this summary and the following detailed description illustrate only some examples of various embodiments, and are not intended to be limiting to the invention as claimed.

DETAILED DESCRIPTION OF THE INVENTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of ordinary skill in the art would consider equivalent to the recited value (i.e., having the same function or result). In many instances, the term "about" may include numbers that are rounded to the nearest significant figure.

Weight percent, percent by weight, % by weight, and the like are synonyms and refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4 and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

As used herein, the term "solid content" refers to $SiO_2$-content of a colloidal silica, unless otherwise indicated.

As used herein, the term "room temperature" refers to 23° C.

In an aspect, the invention relates to a process for the production of activated colloidal silica comprising contacting a colloidal silica feedstock with an activating agent for a period of time sufficient to convert the colloidal silica feedstock into the activated colloidal silica.

Figure 1:
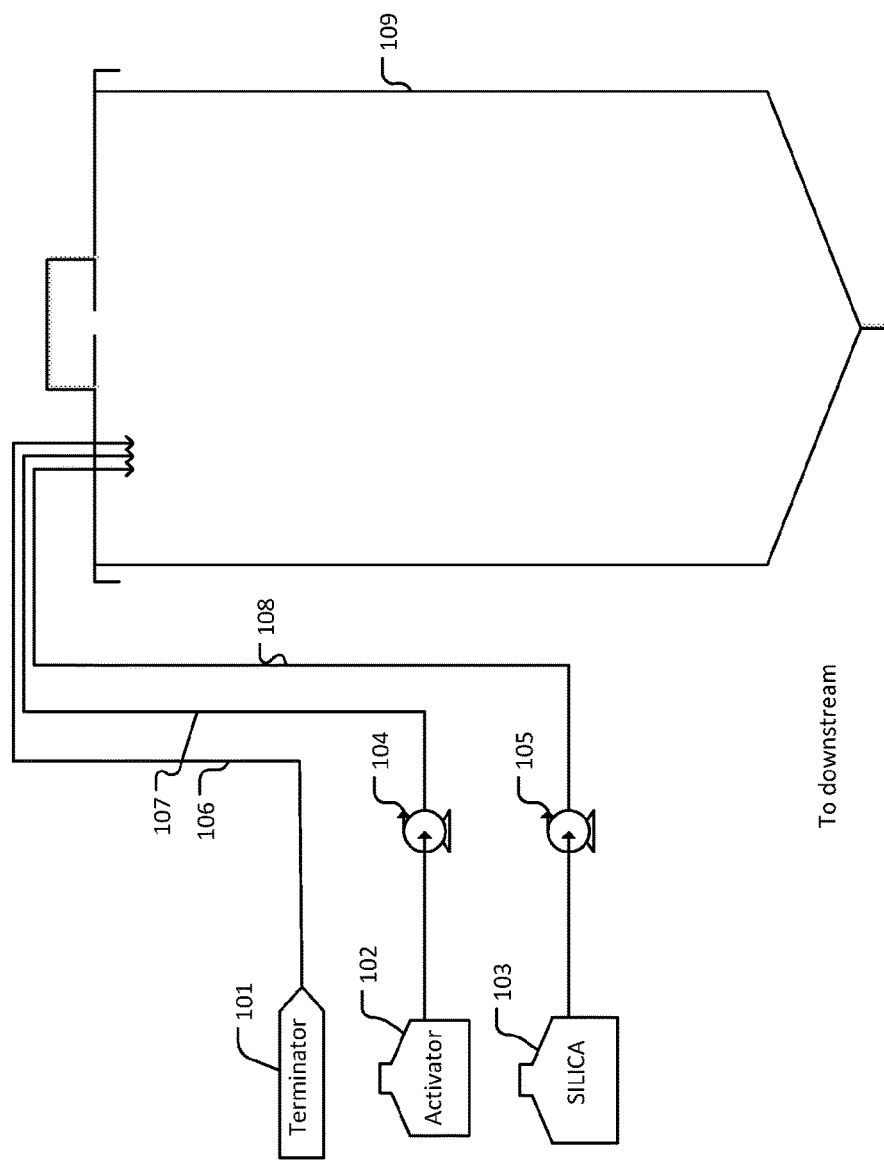
FIG. 1 is a schematic diagram of an apparatus for producing activated colloidal silica according to a first aspect of the present invention.

Referring to FIG. 1, in an aspect of the present invention, the apparatus 100 for producing activated colloidal silica of the present invention comprises: a reaction vessel 109; a colloidal silica tank 103 in fluid communication with the reaction vessel 109 through a colloidal silica line 108 for providing colloidal silica; an activating agent tank 102 in fluid communication with the reaction vessel 109 through an activating agent line 107 for providing activating agent; and a terminator source 101 in fluid communication with the reaction vessel 109 through a terminator line 106 for providing terminator.

In the embodiments according the above aspect, there is no particular limit on the shape of the reaction vessel 109. The reaction vessel may adopt various configurations such as a cylinder shape, a cube, a cone and etc. The size and the volume of the reaction vessel can also be varied depending on the desired amount of the activated colloidal silica and cost.

Figure 3:
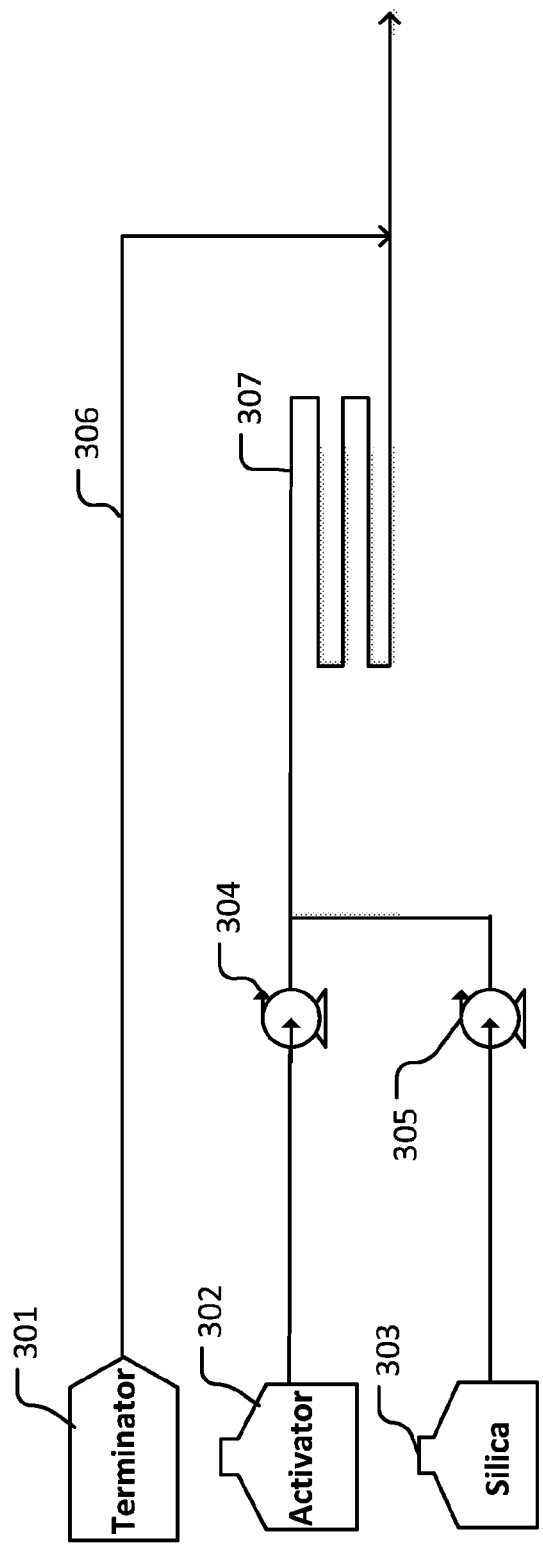
FIG. 3 is a schematic diagram of an apparatus for producing activated colloidal silica according to a second aspect of the present invention.

Referring to FIG. 3, in another aspect of the present invention, the apparatus 300 for producing activated colloidal silica of the present invention comprises: a reaction vessel 307; a colloidal silica tank 303 in fluid communication with the reaction vessel 307 through a colloidal silica line for providing colloidal silica; an activating agent tank 302 in fluid communication with the reaction vessel 307 through an activating agent line for providing activating agent; and a terminator source 301 in fluid communication with the reaction vessel 307 through a terminator line 306 for providing terminator.

In the embodiments according the above aspect, there is no particular limit on the shape of the reaction vessel 307. The reaction vessel may adopt various configurations such as a cylinder shape, a cone, an extensive tube and etc. In a preferred embodiment, the reaction vessel is an extensive tube type reaction vessel. The size and the volume of the reaction vessel can also be varied depending on the desired amount of the activated colloidal silica and cost.

In various embodiments of the present invention, if desired, a transportation means can be installed in any one or more of colloidal silica line, activating agent line and terminator line, such as pumps 104 and 105 shown in FIG. 1. Such transportation means can include, but not limited to, electromagnetic diaphragm pump, pneumatic diaphragm pump, centrifugal pump and the like. In various embodiments of the present invention, if desired, a metering means can also be mounted in any one or more of colloidal silica line, activating agent line and terminator line, to control the amount of the materials added through each of the lines. The metering means includes, but not limited to, a flow meter, a weighter and the like.

In an embodiment of the present invention, the inlets of each of colloidal silica line 108, activating agent line 107 and terminator line 106 are located on the top of the reaction vessel 109 at the same level, as shown in FIG. 1. In a further embodiment, the inlets of each of silica line 108, activating agent line 107 and terminator line 106 are on the top of the reaction vessel 109 and are axially symmetrically distributed along the longitudinal axial of the reaction vessel. By such a design, the supplies of materials will not disturb to each other, and the design is also very convenient.

Figure 5:
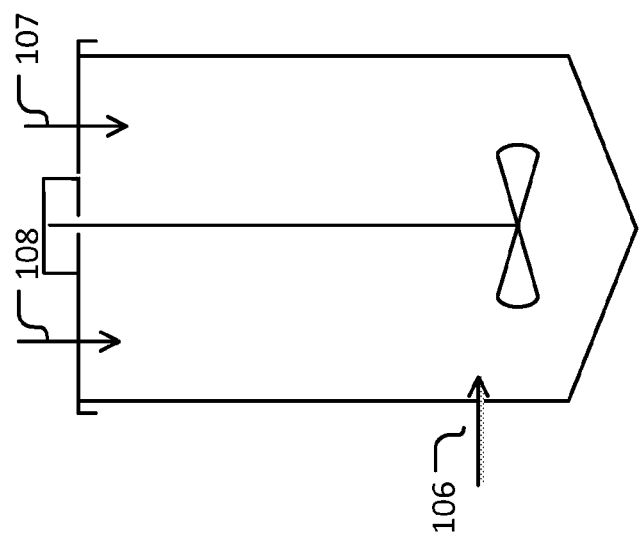
FIG. 5 is a top view of an embodiment of the apparatus for producing activated colloidal silica according to the first aspect of the present invention.
Figure 5:
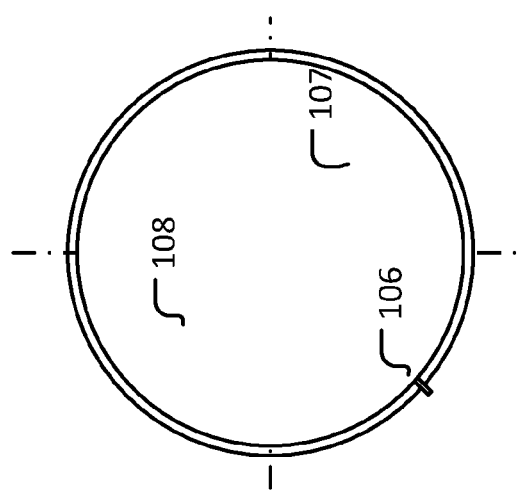

In another embodiment of the present invention, the inlets of each of silica line 108 and activating agent line 107 are located on the top of the reaction vessel 109 and at the same level, while the inlet of the terminator line 106 positioned at the bottom of the side of the reaction vessel 109, as shown in FIG. 5. "The bottom of the side of the reaction vessel" refers to a position from ½ length of the side of reaction vessel to the downend of the reaction vessel. The inlet of the terminator line 106 can be positioned at any position within this range. By using such an embodiment, terminator can be more sufficiently in contact with the reaction mixture in the reaction vessel, so as to terminate the reactions in the reaction vessel in a timely and efficient manner. In such an embodiment, the inlets of each of silica line 108 and activating agent line 107 may also be disposed on the top of the reaction vessel 109 and are axially symmetrically distributed along the longitudinal axis of the reaction vessel.

In various embodiments of the present invention, the tanks for storing colloidal silica material, activating agent material and terminator material can be material tanks conventionally used in the art. There is no particular limitation on the size of the tanks, tanks of tens or hundreds of liters can be used, or tanks of several tons can be used. In a particular embodiment of the present invention, the colloidal silica tank can be in one ton scale, while the activating agent tank can be in 200 liter scale. The materials of the various tanks are the materials which are inert to the materials stored in various tanks. Typically, such materials can be a metal material, such as stainless steel, mild steel and the like, and specifically, SS304 and SS316, etc.; or a plastic material, such as PVC, polyethylene, polypropylene, etc.

In various embodiments of the present invention, the lines for transporting colloidal silica material, activating agent material and terminator material can be conventional pipelines used in the art. In particular, the materials of the pipelines are the materials which are inert to the material transported in the pipelines. Typically, such materials can be a metal material, such as stainless steel, mild steel, etc, specifically, SS304 and SS316, etc.; or a plastic material, such as PVC, polyethylene, polypropylene, etc. The size of these lines can be selected according to the factors such as reaction rate and productivity. In a particular embodiment, the diameter of the line can be, such as, 1, 1.2, 1.5, 1.8 inches.

In various embodiments of the present invention, the terminator source in connection with the reaction vessel through a terminator line can include, but not limited to: water, such as tap water, surface water, soft water; hydroxides, such as sodium hydroxide, potassium hydroxide, ammonium hydroxide and the like; aluminum containing salts, such as sodium aluminate and the like. The terminator source can be stored as a terminator solution in a terminator tank. Alternatively, the terminator source can be a water source in situ of the place where the apparatus of the present invention is exploited, such as a tap water source.

In various embodiments of the present invention, the apparatus of the present invention can further comprise a stirrer positioned in axial center of the reaction vessel. By using a stirrer, the reactions in the reaction vessel can be conducted in a more sufficient and effective way. Typically, the stirrer can be any stirrer that is conventionally used in the art. The depth to which the stirrer is installed shall submerge a position below the level of the reaction mixture filled inside the reaction vessel so that to rapidly and evenly stir the reaction mixtures in the reaction vessel. In general, the installed depth of the stirrer is below the ½ vertical depth of the reaction vessel and above the downend of the reaction vessel. During the progress of the reaction, the stirrer is operated to sufficiently mix and contact the colloidal silica and the activating agent. When the reaction proceeds to a certain extent, for example, a predetermined activation level of the colloidal silica is achieved, the terminator supply is started while lowering the operation frequency of the stirrer, for example, to 90% to 40% or even lower of the original operation frequency, such as to 80%, 70%, 60%, 50% of the original operation frequency, so that to mix the terminator with the activated colloidal silica sufficiently.

In various embodiments of the present invention, the inlets of each of silica line 108 and activating agent line 107 are disposed not in contact with the reaction vessel's sidewall. By this configuration, supplies will not contact the reaction vessel's sidewall to avoid corrosion of the sidewall. Such a configuration also prevents materials, such as colloidal silica, from crystallization on the vessel's sidewall. Therefore, there is no need for frequent down time for cleaning, and production cost can be saved.

In various embodiments of the present invention, the apparatus of the present invention can further comprise a sensor for monitoring the conditions of the colloidal silica in the reaction vessel. By monitoring the conditions of the colloidal silica, the extent of the reaction in the reaction vessel can be determined. On the basis of such an extent, it can be determined whether the reaction materials should be added, or whether the reaction should be terminated. The sensor can be attached to the reaction vessel via a bypass manner. In an embodiment, a sampling line can be mounted on the reaction vessel, and a sensor can be mounted on the sampling line to monitor and analyze the sample in the sampling line. In another embodiment, sensor is directly attached to the reaction vessel. That is, the sensor can be mounted directly on the reaction vessel's sidewall, so to directly monitor and analyze the conditions of the colloidal silica in the reaction vessel. In such an embodiment, the mounting position of the sensor shall be lower than the level of material mixture in the reaction vessel. Typically, in this embodiment, the mounting position of the sensor is located from ½ length of the reaction vessel's sidewall to the downend of the reaction vessel. In the present invention, it is preferably to mount the sensor directly on the reaction vessel's sidewall. Not wishing to be bound to any theories, mounting the sensor directly on the reaction vessel's sidewall can monitor the conditions of the colloidal silica inside the reaction vessel in a more straightforward way, more real parameters of the extent to which the reaction proceeds can be obtained, so that the terminator supply can be started in a timely manner to obtain a quality product. Also not wishing to be bound to any theories, when the sensor is attached to the reaction vessel in a bypass manner, the sample in the bypass may change to a certain extent, such as temperature, concentration, conductivity and pH value and the like, thereby the measured data may deviate from the true conditions of the colloidal silica in the reaction vessel.

In various embodiments of the present invention, the sensor includes but is not limited to a conductivity sensor, a temperature sensor, and a pH sensor and the like.

In a further embodiment of the present invention, the apparatus of the present invention further comprises an additional terminator tank in fluid communication with the reaction vessel through an additional terminator line. The present invention's inventors have found that in certain situations the reaction in the reaction vessel may sometime proceed very severe and/or rapid. Terminating the reaction by only the original terminator source may not timely stop the reaction. In these circumstances, an additional terminator tank in fluid communication with the reaction vessel through an additional terminator line can be introduced. Once the reactions in the reaction vessel proceed too rapidly, the additional terminator supply is then started. The additional terminator can include various alkaline substances, such as organic bases and inorganic bases. Typically, in view of availability and effectiveness, the additional terminator can be sodium hydroxide. The materials and sizes of the additional terminator tank and the additional terminator line are not particularly limited. The materials and sizes used in colloidal silica tank and activating agent tank above can also apply to the additional terminator tank and the additional terminator line.

According to an embodiment of the present invention, a temperature control means can be installed in the reaction vessel, so that the activation process can proceed in a constant temperature.

In various embodiments of the present invention, a cleaning of the reaction vessel may be conducted after each production. The cleaning may be carried out by a separate cleaning means in connection with the reaction vessel, or may be conducted by the terminator source directly to clean the reaction vessel. In a preferred embodiment, the reaction vessel is cleaned directly by the terminator source. In an embodiment, a cleaning means such as a rinsing ball can be mounted in the reaction vessel. The terminator source, such as tap water source, is connected to the rinsing ball. Each time after the end of the reaction, the content of the reaction vessel is discharged, and then the inside of the reaction vessel is cleaned by such a means by using tap water. Thereby, the generation of silica crystals can be prevented and any residues remained in the reaction vessel can be washed off.

In another embodiment, terminator source, such as tap water source, is connected to a downstream position of the reaction vessel through a terminator transporting line. In such an embodiment, colloidal silica and activating agent are reacted in the reaction vessel, while starting the terminator transporting line located upstream of the reaction vessel, and transporting the terminator to the downstream of the reaction vessel to terminate the reaction. Then the terminated reaction mixture is transported to a downstream apparatus, such as a paper making apparatus, through a downstream pipe. If desired, the operation of the apparatus according to this embodiment can be stopped, and the terminator source is started to clean the reaction vessel.

According to a further embodiment of the present invention, a level meter can be installed in the reaction vessel of the present invention, so as to monitor the liquid level of in the reaction vessel.

In another aspect, the present invention relates to a method for producing activated colloidal silica by above apparatus of the present invention, the method comprises contacting the colloidal silica material and the activating agent in the reaction vessel for a time sufficiently to convert the colloidal silica material into activated colloidal silica, and then adding terminator to terminate the reaction, and obtain activated colloidal silica product.

In particular, the method for producing activated colloidal silica by the apparatus for producing activated colloidal silica of the present invention comprises: starting the colloidal silica tank to supply colloidal silica to the reaction vessel through the colloidal silica line; starting the activating agent tank to supply colloidal silica to the reaction vessel through the activating agent line; contacting the colloidal silica with the activating agent for a time sufficient to convert the colloidal silica material into activated colloidal silica; and starting the terminator source to supply the terminator into the reaction apparatus through the terminator line to terminate reaction.

The method of the present invention can be carried out in a batch manner, a semi-batch manner or a continuous manner.

Figure 2:
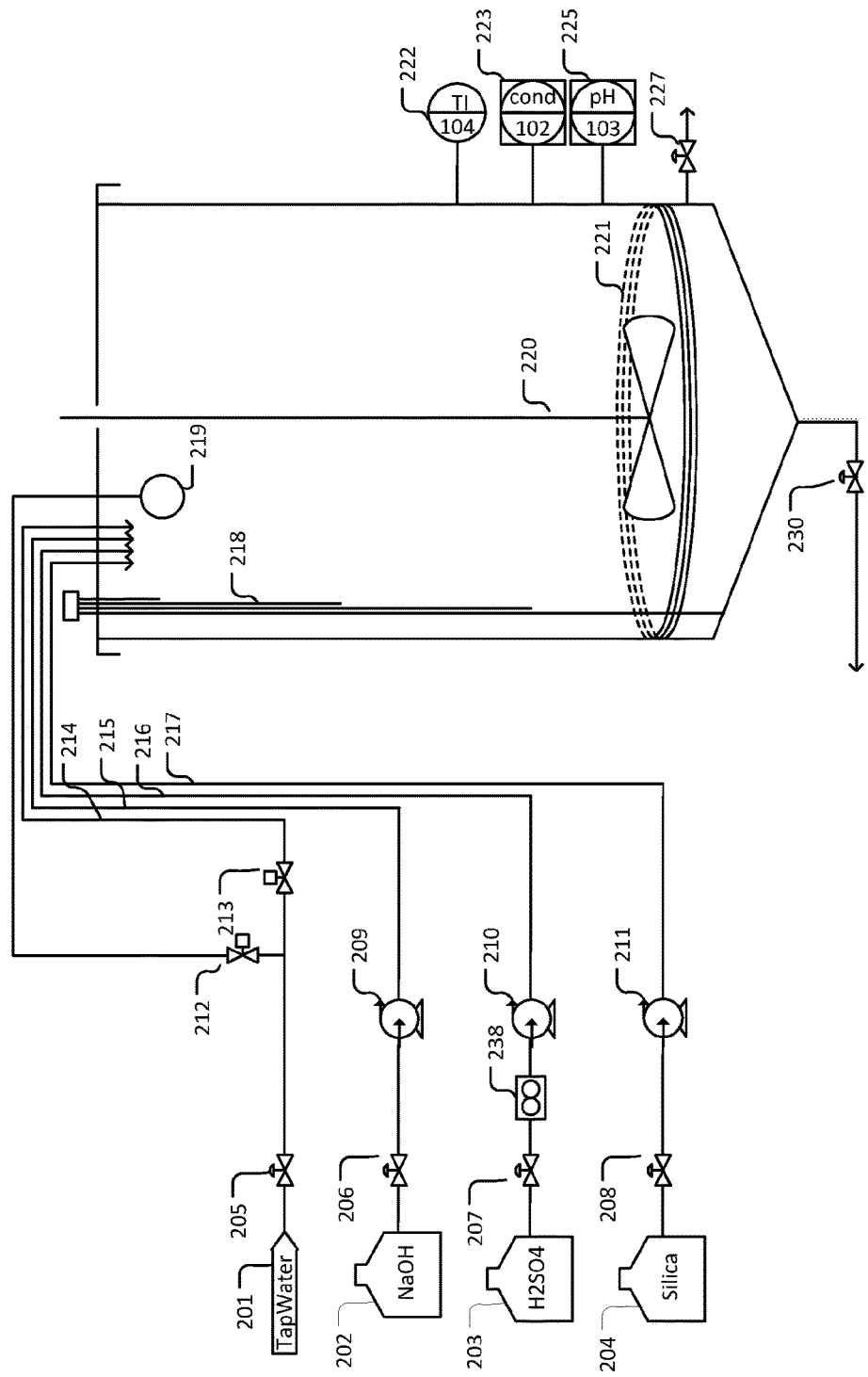
FIG. 2 is a procedure schematic diagram of an apparatus for producing activated colloidal silica according to the first aspect of the present invention.

Referring now to FIG. 2, the method of the present invention in a batch manner will be described in details as below.

First, materials preparing: tank 202 (PVC, 100 liters), tank 203 (PVC, 200 liters), tank 204 (PE, 1 ton) are respectively used to store 30% NaOH, 50% $H_2SO_4$ and colloidal silica. Terminator source is a tap water source, which can be introduced from an in situ tap water source in the manufacturing place. A PVC pipeline having a diameter of 1.2 inches is used as the line for transporting terminator. During the operation, valves 205, 206, 207 and 208 are always in an on state. Then supplies are started: starting pneumatic diaphragm pump 211, one ton colloidal silica material is transported to reaction vessel from tank 204; level meter emitted a signal to stop the pump when monitoring that the material reaches the preset level. Heating tube 221 is started to keep the temperature of the materials in the reaction vessel to be 40 which is monitored at the mean time by temperature sensor 222. At the same time, stirrer 220 operates at a speed of 120 RPM. Electromagnetic diaphragm pump 210 is started to feed 13 liters of 50% sulfuric acid into the reaction tank. A flow meter 238 can be disposed in activating agent line. During the addition of acid, stirrer 220 is always in operation, and the conductivity of the colloidal silica solution is measured by conductivity sensor 223. After 5 minutes, the addition of acid is stopped. During the addition of acid, if an on-line pH meter 225 measures that the solution's pH is under 9, the addition of acid will also be stopped. After the addition of the acid, activation procedure starts. During this period, stirrer 220 operates at a speed of 120 RPM, and the heating rod is also in operation to set the temperature at 40° C. After 1 hour of reaction, valve 213 is started to add one ton tap water as terminator. When level meter 218 detects that the level reaches a preset position, valve 213 is closed. During this period, stirrer 220 operates at a speed of 120 RPM, but the heating means stops. Then all activated colloidal silica is transferred to a product tank for future use. Valve 212 is started to use tap water from terminator source 201 to clean the inside of the reaction tank by rinsing ball 219. When level meter detects the inside of the reaction tank reaches a low level, valve 212 is closed. Valve 227 is for sampling during the reaction. Valve 230 is for discharging after the cleaning of the reaction vessel during the down time.

Figure 4:
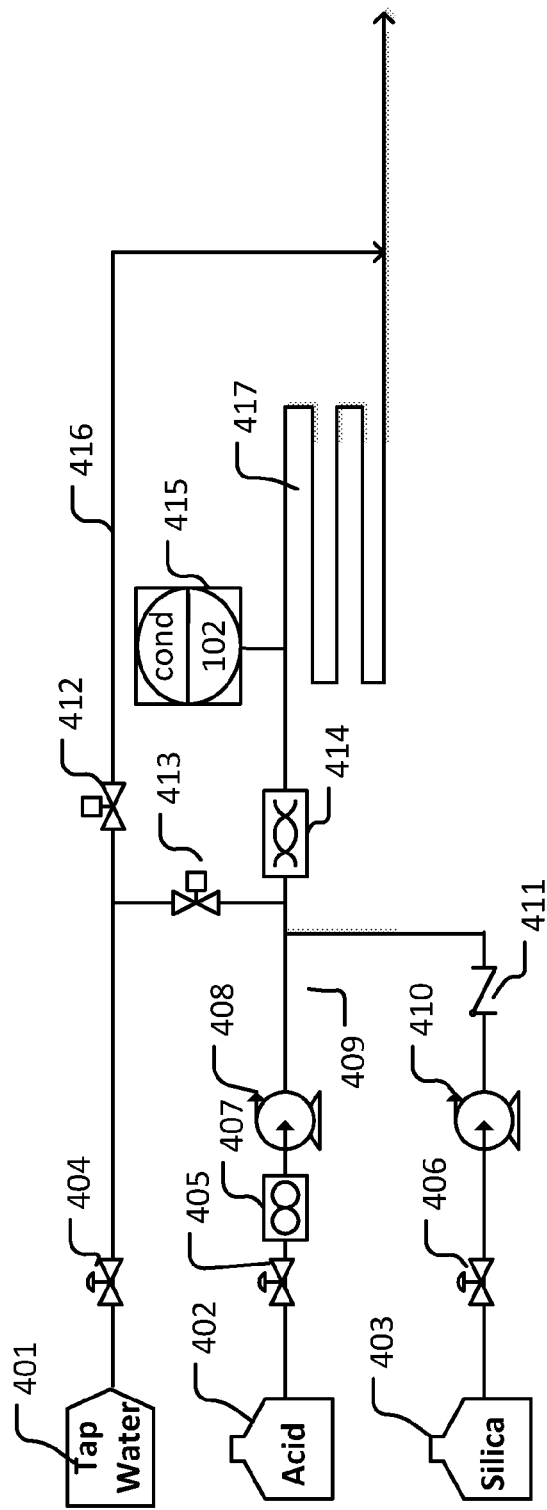
FIG. 4 is a procedure schematic diagram of an apparatus for producing activated colloidal silica according to the second aspect of the present invention.

Referring now to FIG. 4, the method of the present invention in a continuous manner will be described in detail below.

Tank 402 (PVC, 200 liters) and tank 403 (PE, one ton) are used to respectively store 50% $H_2SO_4$ and colloidal silica. Terminator source 401 is a tap water source, which can be introduced in situ in the manufacture place. A PVC pipe having a diameter of 1.2 inches is used as the terminator transporting line. A flow meter 407 can be disposed in the activating agent transporting line. During the operation, valves 404, 405 and 406 are always in the on state. Pump 410 and pump 408 are started simultaneously to transfer colloidal silica material and 50% sulfuric acid into a mixer 414 respectively. After an even mixing, the mixture is transferred to an extensive tube 417 for activation. A controller automatically adjusts the flow rate ratio between pump 408 and pump 410, such as 0.013:1, so that to adjust the reading on the on-line conductivity sensor 415. Electronic ball valve 412 is in the on state. Tap water as the terminator is mixed with activated colloidal silica to terminate the activation. The product is mixed to homogeneity to provide to the user. Each time after the apparatus stops producing, valve 412 is closed and valve 413 is started, so that tap water from terminator source 401 flows through the extensive tube to clean the pipelines. If a conductivity meter 415 detects a too high conductivity, valve 412 is closed to prevent the generation of gels in reaction tube 417, and valve 413 is started, tap water will terminate the reaction of the material with a too high conductivity. After cleaning, the solution is discharged through a downstream pipeline.

The activation time in the reaction vessel used in the method of present invention can be varied widely in a broad range. In an embodiment, the contacting time can be from 1 second to 1 week, such as in a range of 1 minute to 24 hours, 5 minutes to 12 hours, 10 minutes to 8 hours, 30 minutes to 6 hours, or 1 hour to 4 hours.

Examples of the activating agent useful in the invention include, but are not limited to, inorganic acids, such as sulfuric acid, hydrochloric acid, nitric acid, phosphoric acid, carbonic acid; organic acids, such as formic acid, acetic acid, propionic acid, butyric acid, citric acid, oxalic acid, malonic acid, maleic acid, fumaric acid, benzoic acid, benzene sulfonic acid, p-toluene sulfonic acid; and salts, such as sodium bicarbonate, potassium bicarbonate, monosodium phosphate, monopotassium phosphate, disodium phosphate, dipotassium phosphate, sodium chloride, potassium chloride, sodium sulfate, potassium sulfate, sodium nitrate, potassium nitrate, sodium chlorate, potassium chlorate.

In embodiments where the activating agent is at least one selected from the inorganic acids and the organic acids, the activating agent is used in such an amount that the pH value of the activation reaction mixture is in a range of from a lower limit of 0.5, 1.0, 2.0, 3.0, 4.0, 4.5, 5.0, 5.5, 6.0, 6.5, 7.0, 7.5, 8.0, 8.5, or 9.0 to an upper limit of 11.0, 10.0, 9.8, 9.7, 9.6, 9.5, 9.4, 9.3, 9.2, 9.1, 9.0, 8.7, 8.5, 8.2, 8.0, 7.7, 7.5, 7.2, 7.0, 6.5, 6.0, 5.5, 5.0, 4.0, 3.5, or 3.0, provided that the lower limit is less than the upper limit. In an aspect of these embodiments, the colloidal silica feedstock is unmodified, and the activating agent is used in an amount so as to afford an activation reaction mixture having a pH value of from 7.5 to 10.5. In another aspect of these embodiments, the colloidal silica feedstock is Al-modified, and the activating agent is used in an amount so as to afford an activation reaction mixture having a pH value of from 0.5 to 3.5.

In embodiments where the activating agent is at least one salt, the activating agent is used in such an amount that the activation reaction mixture has a conductivity of from 0.1 mS/cm to 100 mS/cm, preferably from 1 mS/cm to 100 mS/cm, preferably from 2 mS/cm to 80 mS/cm, and more preferably from 3 mS/cm to 50 mS/cm, greater than the conductivity of the colloidal silica feedstock.

The activation time employed in the present process may vary in a wide range. In an embodiment, the contacting time is in a range of from 1 second to 1 week, such as from 1 minute to 24 hours, from 5 minutes to 12 hours, from 10 minutes to 8 hours, from 30 minutes to 6 hours, or from 1 hour to 4 hours.

The present process may be conveniently performed at room temperature or, alternatively, at a lower or higher temperature. For example, the present process may be performed at a temperature in a range of from 0 to 80° C., such as from 5 to 60° C., from 10 to 50° C., from 15 to 40° C., or from 20 to 30° C.

The colloidal silica used as feedstock in the present process may have a specific surface area of from 400 m$^2$/g to 1100 m$^2$/g, preferably from 500 m$^2$/g to 900 m$^2$/g, and more preferably from 600 m$^2$/g to 800 m$^2$/g, an S-value of from 10 to 50, and a solid content of up to 20 wt %, preferably from 5 to 20 wt %, more preferably from 8 to 18 wt %, and even more preferably from 9 to 17.5 wt %. Preferably, the colloidal silica feedstock has a relatively high S-value, for example, an S-value of from 25 to 40% so that the colloidal silica feedstock can have a high solid content. The given S-value has been measured and calculated in accordance with what is disclosed by R. K. Iler and R. L. Dalton in J. Phys. Chem. 60 (1956), 955-957.

The particles in the colloidal silica used as feedstock in the present process may be unmodified silica particles or silica particles which are surface modified with aluminum, boron, or other metal. The colloidal silicas which contain silica which is not modified are preferred. For aluminum-, boron-, or other metal-modified silica particles, these are suitably modified to a degree of from 2 to 25 percent, suitably from 3 to 20 percent. With a degree of modification is meant the part of modifying atoms which have replaced silicon atoms in the surface of the silica particles. The degree of modification is given in percent and is calculated on basis of 8 silanol groups per nm$^2$. This is described by Iler, R. K. in Journal of Colloidal and Interface Science, 55(1976):1, 25-34.

Such colloidal silicas are commercially available under the trade names N3295, N8691, N8692, N8699 from Nalco; NP580, NP882, NP2180, and 32K from EKA.

In an embodiment, the colloidal silica used as feedstock in the present process may be prepared by a process comprising: (a) forming an initial composition containing water, an alkali metal silicate having a molar ratio of SiO$_2$ to alkali metal oxide in the range of from 15:1 to 1:1 and a pH of at least 10, typically at least 11, and an acid (and/or a corresponding salt thereof), the alkali metal silicate and the acid (and/or a corresponding salt thereof) being initially present in a ratio by weight of at least 63:1, while maintaining the temperature of the initial composition below 100° F., preferably below 85° F., typically from 60-85° F.; (b) slowly and continuously adding to the initial composition an aqueous silicic acid composition typically having a SiO$_2$ content in the range of from 4.0 to 8.5 percent by weight, preferably from 5.0 to 7.2 percent by weight, preferably from 6.0 to 6.8 percent by weight, while maintaining the temperature of the composition below 100° F., typically from 60-85° F., until from one-half to three-quarters of the silicic acid composition has been added to the initial composition; (c) slowly increasing the temperature of the composition, for example over a period of time of from about 10-35 minutes, to from 115-125° F. and maintaining the temperature until the addition of the silicic acid composition is complete; (d) optionally, maintaining the temperature of the composition below 125° F., typically from 115 to 125° F. for about an hour; and (e) discontinuing the heating and optionally removing water from the resulting composition until the solid content based on SiO$_2$ of the resulting composition is about 8 percent by weight or higher, typically from 11 percent by weight to 20 percent by weight. For more details with respect to the preparation of the colloidal silicas, see, for example, U.S. Pat. Nos. 2,244,355, 3,582,502, 5,368,833, 5,643,414, 6,372,089, 6,372,806, and 6,486,216, the disclosures of which are herein incorporated by reference.

In the embodiments of present invention, the colloidal silica produced in accordance with the above manner is stored in the colloidal silica tank for producing activated colloidal silica of the present invention.

The present process results in an activated colloidal silica having an S-value of at least 10%, or at least 20%, or at least 30%, or at least 40%, or at least 50%, lower than the S-value of the initial colloidal silica feedstock.

In another aspect, the present invention relates to the activated colloidal silica prepared by the above described process, which activated colloidal silica may have a high solid content and a low S-value.

In some embodiments, the activated colloidal silica according to the invention has a specific surface area of from 400 m$^2$/g to 1100 m$^2$/g, from 500 m$^2$/g to 900 m$^2$/g, and from 600 m$^2$/g to 800 m$^2$/g, an S-value of from 6 to 30%, from 10 to 20%, and a solid content of up to 20 wt %, from 5 to 20 wt %, from 8 to 18 wt %, and from 9 to 17.5 wt %.

In some embodiments, the activated colloidal silica according to the invention has a Brookfield viscosity of from 1 cps to 2000 cps.

In some embodiments, the activated colloidal silica according to the invention has a shelf life of less than 30 days, such as less than 7 days, for example, from 1 day to 7 days.

The activated colloidal silica compositions of the invention have been shown to be from 20 to 70 percent more effective as a drainage and retention aid in the papermaking process compared to the un-activated colloidal silica compositions. While the preferred utility for colloidal silica compositions of the invention is as a drainage and retention aid in the production of paper, compositions of the invention may be utilized for other purposes, for example, for beer, wine, juice, and sugar clarification; water clarification including raw and waste water clarification; as catalyst supports; as a component of coating compositions; as a coating component for plastics; as an abrasion resistant coating component; for investment casting; as a component of ceramic fireplace logs; and in refractory materials.

Thus, in a further aspect, the present invention relates to the use of the activated colloidal silica according to the invention as a chemical additive, particularly in the production of paper.

Accordingly, in an embodiment, the invention resides in a method of improving the production of paper which comprises the step of adding to a paper mill furnish from about 0.0001 to about 1.25 percent by weight based on the dry weight of fibers in the furnish of the activated colloidal silica of the invention calculated as SiO$_2$. In an embodiment, a nonionic, cationic, anionic, zwitterionic, or amphoteric polymeric flocculant may be added to the furnish either before or after the addition of the activated colloidal silica in an amount of from about 0.001 to about 0.5 percent by weight based on dry weight of fibers in the furnish. A cationic starch may alternatively be added to the furnish in place of, or in addition to the synthetic polymer flocculant in an amount of from about 0.005 to about 5.0 percent by weight based on the dry weight of fibers in the furnish. More preferably, the starch is added in an amount of from about 0.05 to about 1.5 percent by weight based on the dry weight of fibers in the furnish. In yet another embodiment, a coagulant may be added to the furnish in place of, or in addition to, the flocculant and/or the starch in an amount of from about 0.005 to about 1.25 percent by weight based on the dry weight of fibers in the papermaking furnish. In an embodiment, the coagulant is added in an amount of from about 0.025 to about 0.5 percent by weight based on the dry weight of fibers in the furnish.

In an embodiment, the invention also resides in a method for increasing retention and drainage of a papermaking furnish on a papermaking machine which comprises the step of adding to a papermaking furnish from about 0.0001 to about 1.25 percent by weight based on the dry weight of fibers in the furnish of the activated colloidal silica of the invention calculated as SiO$_2$. The activated colloidal silica may be added to the papermaking furnish along with a nonionic, cationic, anionic, zwitterionic, or amphoteric polymeric flocculant. The flocculant may be added either before or after the activated colloidal silica in an amount of from about 0.001 to about 0.5 percent by weight based on the dry weight of fibers in the furnish. Starch may alternatively be added to the furnish in place of, or in addition to, the flocculant in an amount of from about 0.005 to about 5.0 percent by weight based on dry weight of fibers in the furnish. If a starch is utilized, it may be cationic starch. When used, the cationic starch is preferably added in an amount of from about 0.05 to about 1.25 percent by weight based on the dry weight of fibers in the furnish. In yet another embodiment, a coagulant may be added to the furnish in place of, or in addition to, the flocculant and/or the cationic starch in an amount of from about 0.005 to about 1.25 percent by weight based on the dry weight of fibers in the furnish. Preferably, the coagulant is added in an amount of from about 0.025 to about 0.5 percent by weight based in the dry weight of fibers in the furnish.

In an alternative embodiment, the invention resides in a process for the production of paper, which comprises:

(a) providing a suspension containing cellulose fibers, and optional fillers;

(b) adding to said suspension a nonionic, cationic, anionic, zwitterionic, or amphoteric polymeric flocculant in an amount of at least 0.01 kg/ton, based on dry fibers and optional fillers;

(c) adding to said suspension the colloidal silica of the invention in an amount of at least 0.001 kg/ton, calculated as SiO$_2$ on dry fibers and optional fillers; and (d) thereafter forming and dewatering the obtained suspension on a wire to form paper.

The dosage of the polymeric flocculant in any of the above embodiments is preferably from about 0.005 to about 0.2 weight percent based on the dry weight of fibers in the furnish. The dosage of the activated colloidal silica calculated as SiO$_2$ is preferably from about 0.005 to about 0.25 percent by weight based on the weight of dry fibers in the furnish, and most preferably from about 0.005 to about 0.15 percent by weight of fibers in the furnish.

It should be pointed out that since this invention is applicable to a broad range of paper grades and furnishes, the percentages given above may occasionally vary. It is within the spirit and intent of the invention that variance can be made from the percentages given above without departing from the invention, and these percentage values are given only as guidance to one skilled in the art.

In any of the above embodiments, bentonite, talc, synthetic clays, hectorite, kaolin, or mixtures thereof may also he added anywhere in the papermaking system prior to sheet formation. An addition point is the thick stock pulp before dilution with whitewater.

In addition, any of the above embodiments may be applied to papermaking furnish selected from the group consisting of fine paper (which as used herein includes virgin fiber based as well as recycle-fiber based materials), board (which as used herein includes recycle-fiber based test liner and corrugating medium as well as virgin-fiber based materials), and newsprint (which as used herein includes magazine furnishes as well as both virgin fiber and recycle-fiber based), or other cellulosic material. These furnishes include those that are wood-containing, wood-free, virgin, bleached recycled, unbleached recycled, and mixtures thereof.

Paper or paperboard is generally made from a suspension of furnish of cellulosic material in an aqueous medium, which furnish is subjected to one or more shear stages, in which such stages generally are a cleaning stage, a mixing stage and a pumping stage, and thereafter the suspension is drained to form a sheet, which sheet is then dried to the desired, and generally low, water concentration. The activated colloidal silicas of the invention may be added to the furnish before or after a shear stage.

In addition to the retention and drainage aid applications described above, the activated colloidal silicas of the invention may be used in conjunction with standard cationic wet strength resins to improve the wet strength of cellulosic sheet so treated. When utilized in this manner the activated colloidal silica is added to the furnish prior to placement of the furnish, containing the wet strength resin, on a paper machine. The activated colloidal silica is generally utilized at the levels set forth above.

The activated colloidal silica of the invention has been found to significantly enhance the performance of synthetic polymeric flocculants and retention aids, and starch in the papermaking process. Further, the activated colloidal silicas are believed to have utility as additives in solids/liquids separation processes such as water pretreatment, and in wastewater treatment applications. The activated colloidal silicas of the invention in addition to enhancing drainage and retention in newsprint, fine paper, board and other paper grades, may also find utility in pitch and stickies control in papermaking, pulp dewatering in the production of dry-lap pulp, saveall and clarifier applications in pulp and paper mills, water clarification, dissolved air flotation and sludge dewatering. The activated colloidal silica compositions of the invention may also find utility in solid/liquid separation or emulsion breaking.

Examples of such applications include municipal sludge dewatering, the clarification and dewatering of aqueous mineral slurries, refinery emulsion breaking and the like. The enhanced performance seen utilizing the activated colloidal silicas of the invention in combination with synthetic polymers and/or starch includes higher retention, improved drainage and improved solids/liquids separation, and often a reduction in the amount of polymer or starch used to achieve the desired effect.

Microparticle retention programs are based on the restoration of the originally formed flocs broken by shear. In such applications, the flocculant is added before at least one high shear point, followed by the addition of microparticle just before the headbox. Typically, a flocculant will be added before the pressure screens, followed by the addition of microparticle after the screens. However, a method wherein this order may be reversed is contemplated herein. Secondary flocs formed by the addition of microparticles result in increased retention and drainage without detrimentally affecting formation of the sheet. This allows increased filler content in the sheet, eliminates two-sidedness of the sheet, and increases drainage and speed of the machine in paper manufacturing.

The use of a slight excess of polymeric flocculant and/or coagulant is believed necessary to ensure that the subsequent shearing results in the formation of microflocs which contain or carry sufficient polymer to render at least parts of their surfaces positively charged, although it is not necessary to render the whole furnish positively charged. Thus the zeta potential of the furnish, after the addition of the polymer and after the shear stage, may be cationic or anionic.

Shear may be provided by a device in the apparatus used for other purposes, such as a mixing pump, fan pump or centriscreen, or one may insert into the apparatus a shear mixer or other shear stage for the purpose of providing shear, and preferably a high degree of shear, subsequent to the addition of polymer.

The flocculants used in the application of this invention are high molecular weight water soluble or dispersible polymers which may have a cationic or anionic charge. Nonionic high molecular weight polymers may also be utilized. These polymers may be completely soluble in the papermaking system, or alternatively may be readily dispersible. They may have a branched or crosslinked structure provided that they do not form objectionable "fish eyes", so called globs of undissolved polymer on the finished paper. Polymers of these types are readily available from a variety of commercial sources. They are available as dry solids, aqueous solutions, water-in-oil emulsions which when added to water allow the polymer contained therein to rapidly solubilize, or as dispersions of the water soluble or dispersible polymer in aqueous brine solutions. The form of the high molecular weight flocculant used herein is not deemed to be critical so long as the polymer is soluble or dispersible in the furnish.

As stated above, the polymers may be cationic, anionic, nonionic, zwitterionic, or amphoteric. Cationic polymer flocculants useful herein are generally high molecular vinyl addition polymers which incorporate a cationic functional group. These polymers are generally homopolymers of water soluble cationic vinyl monomers, or may be copolymers of a water soluble cationic vinyl monomer with a nonionic monomer such as acrylamide or methacrylamide. The polymers may contain only one cationic vinyl monomer, or may contain more than one cationic vinyl monomer. Alternatively, certain polymers may be modified or derivatized after polymerization such as polyacrylamide by the mannich reaction to produce a cationic vinyl polymer useful in the invention. The polymers may have been prepared from as little as 1 mole percent cationic monomer to 100 mole percent cationic monomer, or from a cationically modified functional group on a post polymerization modified polymer. Most often the cationic flocculants will have at least 5 mole percent of cationic vinyl monomer or functional group, and most preferably, at least 10 weight percent of cationic vinyl monomer or functional group.

Suitable cationic vinyl monomers useful in making the cationically charged vinyl addition copolymers and homopolymers suitable for this invention will be well known to those skilled in the art. These materials include: dimethylaminoethyl methacrylate (DMAEM), dimethylaminoethyl acrylate (DMAEA), diethylaminoethyl acrylate (DEAEA), diethylaminoethyl methacrylate (DEAEM) or their quaternary ammonium forms made with dimethyl sulfate or methyl chloride, mannich reaction modified polyacrylamides, diallylcyclohexylamine hydrochloride (DACHA HCl), diallyldimethylammonium chloride (DADMAC), methacrylamidopropyltrimethylammonium chloride (MAPTAC) and allyl amine (ALA). Cationized starch may also be used as a flocculant herein. The flocculant selected may be a mixture of those stated above, or a mixture of those stated above with a cationic starch. Those skilled in the art of cationic polymer based retention programs will readily appreciate that the selection of a particular polymer is furnish, filler, grade, and water quality dependent.

High molecular weight anionic flocculants which may be useful in this invention are preferably water-soluble or dispersible vinyl polymers containing 1 mole percent or more of a monomer having an anionic charge. Accordingly, these polymers may be homopolymers of water soluble anionically charged vinyl monomers, or copolymers of these monomers with for instance non-ionic monomers such as acrylamide or methacrylamide. Examples of suitable anionic monomers include acrylic acid, methacrylic acid, 2-acrylamido-2-methylpropane sulfonic acid (AMPS) and mixtures thereof as well as their corresponding water soluble or dispersible alkali metal and ammonium salts. The anionic high molecular weight polymers useful in this invention may also be either hydrolyzed acrylamide polymers or copolymers of acrylamide or its homologues, such as methacrylamide, with acrylic acid or its homologues, such as methacrylic acid, or with such vinyl monomers as maleic acid, itaconic acid, vinyl sulfonic acid, or other sulfonate containing monomers. Anionic polymers may contain sulfonate or phosphonate functional groups or mixtures thereof, and may be prepared by derivatizing polyacrylamide or polymethacrylamide polymers or copolymers. The most preferred high molecular weight anionic flocculants are acrylic acid/acrylamide copolymers, and sulfonate containing polymers such as those prepared by the polymerization of such monomers as 2-acrylamido-2-methylpropane sulfonate, acrylamido methane sulfonate, acrylamido ethane sulfonate and 2-hydroxy-3-acrylamido-propane sulfonate with acrylamide or other non-ionic vinyl monomer. When used herein the polymers and copolymers of the anionic vinyl monomer may contain as little as 1 mole percent of the anionically charged monomer, and preferably at least 10 mole percent of the anionic monomer. Again, the choice of the use of a particular anionic polymer will be dependent upon furnish, filler, water quality, paper grade, and the like.

While most microparticle programs perform well with only a high molecular weight cationic flocculant, the activated colloidal silicas of the invention may also be utilized with high molecular weight anionic water soluble flocculants with the addition of a cationic coagulant.

Nonionic flocculants useful in the invention may be selected from the group consisting of polyethylene oxide and poly(meth)acrylamide. In addition to the above, it may be advantageous to utilize so called amphoteric water soluble polymers in certain cases. These polymers carry both a cationic and an anionic charge in the same polymer chain.

The nonionic, cationic, anionic, zwitterionic, and amphoteric vinyl polymer flocculants useful herein will generally have a molecular weight of at least 500,000 daltons, and preferably molecular weights of 1,000,000 daltons and higher. Water soluble and/or dispersible flocculants useful herein may have a molecular weight of 5,000,000 or higher, for instance in the range of from 10 to 30 million or higher. The polymers suitable for the invention may be entirely water soluble when applied to the system, or may be slightly branched (two-dimensional) or slightly cross linked (three dimensional) so long as the polymers are dispersible in water. The use of polymers which are entirely water soluble is preferred, but dispersible polymers, such as those described in WO 97/16598, the disclosure of which is incorporated herein by reference, may be employed. Polymers useful may be substantially linear as such term is defined in Langley et. al., U.S. Pat. No. 4,753,710 the disclosure of which is incorporated herein by reference for all purposes. The upper limit for molecular weight is governed by the solubility or dispersibility of the resulting product in the papermaking furnish.

Cationic or amphoteric starches useful in the application of this invention are generally described in U.S. Pat. No. 4,385,961, the disclosure of which is incorporated herein by reference. Cationic starch materials are generally selected from the group consisting of naturally occurring polymers based on carbohydrates such as guar gum and starch. The cationic starch materials believed to be most useful in the practice of this invention include starch materials derived from wheat, potato and rice. These materials may in turn be reacted to substitute ammonium groups onto the starch backbone, or cationize in accordance with the process suggested by Dondevne et al. in WO 96/30591, the disclosure of which is incorporated herein by reference. In general, starches useful for this invention have a degree of substitution (d.s.) of ammonium groups within the starch molecule between about 0.01 and 0.05. The d.s. is obtained by reacting the base starch with either 3-chloro-2-hydroxypropyl-trimethylammonium chloride or 2,3-epoxypropyl-trimethylammonium chloride to obtain the cationized starch. As will be appreciated, it is beyond the scope and intent of this invention to describe means for the cationizing of starch materials and these modified starch materials are well known and are readily available from a variety of commercial sources.

Various characteristics of the cellulosic furnish, such as pH, hardness, ionic strength and cationic demand, may affect the performance of a flocculant in a given application. The choice of the flocculant involves consideration of the type of charge, charge density, molecular weight and type of monomers and is particularly dependent upon the water chemistry of the furnish being treated.

Other additives may be charged to the cellulosic furnish without any substantial interference with the activity of the present invention, and such other additives include for instance sizing agents, such as alum and rosin, pitch control agents, extenders, biocides and the like. The cellulosic furnish to which the retention aid program of the invention is added may also contain pigments and/or fillers such as titanium dioxide, precipitated and/or ground calcium carbonate, or other mineral or organic fillers. It is possible that the instant invention may be combined with other so called microparticle programs such as bentonite and kaolin. When papermakers change grades or furnishes, it is possible that in certain situations the combination of the activated colloidal silicas of the invention with other microparticles may be practical and desirable.

The activated colloidal silicas of the invention may also be used in combination with a coagulant according to the teachings of Sofia et. al., U.S. Pat. No. 4,795,531, the disclosure of which is herein incorporated by reference for all purposes. Sofia teaches a microparticle program in which a microparticle is utilized in the presence of a cationic coagulant and a high molecular weight charged flocculant.

The cationic coagulant materials which may find use in this aspect of the invention include well known commercially available low to mid molecular weight water soluble polyalkylenepolyamines including those prepared by the reaction of an alkylene polyamine with a difunctional alkyl halide. Materials of this type include condensation polymers prepared from the reaction of ethylenedichloride and ammonia, ethylene dichloride, ammonia and a secondary amine such as dimethyl amine, epichlorohydrin-dimethylamine, epichlorohydrin-dimethylamine-ammonia, polyethyleneimines, and the like. Also useful will be low molecular weight solution polymers and copolymers of vinyl monomers such as diallyldimethylammonium halides, especially diallyldimethylammonium chloride, dialkylaminoalkylacrylates, dialkylaminoalkylacrylate quaternaries, and the like where 'alkyl' is meant to designate a group having 1-4, and preferably 1-2 carbon atoms. Preferably 'alkyl' is methyl. These monomers are exemplified by such materials as dimethylaminoethyl acrylate, dimethylaminoethyl methacrylate and their water soluble quaternary ammonium salts.

In certain cases cationic starch may be employed as the coagulant. Inorganic coagulants, e.g., alum and polyaluminum chloride, may also be used in this invention. The usage rate of inorganic coagulants is typically from 0.05 to 2 weight percent based on the dry weight of fibers in the furnish. The use of a coagulant with the activated colloidal silicas of the invention is optional.

The method of the invention is applicable to all grades and types of paper products that contain the fillers described herein, and further applicable for use on all types of pulps including, without limitation, chemical pulps, including sulfate and sulfite pulps from both hardwood and softwood, thermo-mechanical pulps, mechanical pulps and groundwood pulps.

The amount of any mineral filler used in the papermaking process, generally employed in a papermaking stock is from about 10 to about 30 parts by weight of the filler per hundred parts by weight of dry fibers in the furnish, but the amount of such filler may at times be as low as about 5, or even 0, parts by weight, and as high as about 40 or even 50 parts by weight, same basis.

In a further aspect, the invention resides in a method for improving the performance of a retention and drainage program comprising a colloidal silica in the production of paper, comprising contacting the colloidal silica with an activating agent for a period of time sufficient to lower the S-value of the colloidal silica by at least 10%, prior to the addition of the colloidal silica to a furnish for papermaking.

In an embodiment of this aspect of the invention, the colloidal silica has a specific surface area of from 500 $m^2/g$ to 1100 $m^2/g$, and from 600 $m^2/g$ to 1000 $m^2/g$, an S-value of from 20 to 50%, and from 25 to 45%, and a solids content of up to 20 wt %, and from 8 to 15 wt %.

In an embodiment of this aspect of the invention, the contacting time is in a range of from about 1 minute to about 7 days, such as from about 2 minutes to about 5 days, from about 3 minutes to about 3 day, from about 5 minutes to about 24 hours, from about 10 minutes to about 12 hours, from about 15 minutes to about 8 hours, from about 20 minutes to about 4 hours, from about 25 minutes to about 3 hours, or from about 30 minutes to about 150 minutes.

In an embodiment of this aspect of the invention, the contacting step can be carried out at a temperature of from about 10° C. to about 60° C., such as from about 20° C. to about 50° C., or from about 20° C. to about 30° C., or at room temperature.

The activating agent and the amount thereof, the retention and drainage programs, and the process of papermaking are as described hereinabove.

The following examples are intended to illustrate the invention and should not be construed as a limitation thereof.

EXAMPLES

Examples 1 and 2

Activated colloidal silicas #1 and #2 were prepared by adding 4.36 g of 15% sulfuric acid into 100 g of colloidal silica (N8699, available from Nalco Chemical Company) to afford a mixture having a pH value of 9.0, and then aging the mixture at room temperature for 30 and 60 minutes, respectively. Samples of the activated colloidal silicas #1 and #2 were analyzed and the results are shown in Table 1 below. For comparison, the results for Colloidal Silica 32K (an aluminum-modified silica sol, available from EKA Nobel, AB) and Colloidal Silica N8699 are also listed.

TABLE 1

| | Ex. No. | | | |
|---|---|---|---|---|
| | — | — | 1 | 2 |
| Colloidal Silica | 32K | N8699 | #1 | #2 |
| Specific Surface Area, $m^2/g$ | 633 | 780 | / | / |
| pH | 9.49 | 10.77 | 9.00 | 9.00 |
| $SiO_2$ % | 8.48 | 14.90 | 14.2 | 14.2 |
| S-value, % | 24.1 | 35.4 | 20.4 | 16.7 |

Retention performance of these colloidal silicas was evaluated on DFR-05, available from GB Co., Germany as follows. A stuff for culture papers consisting of, based on pulp, 20 wt % long fiber, 60 wt % short fiber, and 20 wt % chemical-mechanical pulp fiber was diluted with white-water to form a furnish having a consistency of about 1%, a pH value of 7.84, a conductivity of 1270 μs/cm, and an anionic trash of 123.2 μeq/L. To the furnish was added with 30 wt %, calculated as dry weight on dry fibers weight, of precipitated calcium carbonate as filler. To the furnish were also added with a cationic starch (Cato305 from National Starch) in an amount of 10 kg/ton, a cationic polyacrylamide (cPAM) (N61067 from Nalco Chemical Company) in an amount of 0.125 kg (effective dry weight)/ton, and the individual colloidal silica in a specified amount. All given dosages of the additives in this and following examples are calculated as dry on dry fibers and optional fillers. The addition sequence we as follows:

| Sequence Time (sec) | Action |
|---|---|
| 0 | Add furnish |
| 5 | Add cationic starch |
| 10 | Add filler |
| 20 | Add cPAM |
| 25 | Add colloidal silica. |

The results are shown in Table 2 below.

TABLE 2

| Amount of colloidal silica | First pass ash retention (FPAR) (%) | | | |
|---|---|---|---|---|
| (ppm per active) | 32K | N8699 | #1 | #2 |
| 0 | 33.6 | 33.6 | 33.6 | 33.6 |
| 250 | 41.4 | 39.1 | 39.8 | 43.2 |
| 500 | 50.1 | 48.3 | 49.7 | 54.9 |
| 750 | 58.3 | 55.5 | 55.6 | 66.5 |

From the data given in Table 2 it can be seen that the activated colloidal silicas of Examples 1 and 2 exhibit improved performance in terms of FPAR over the un-activated colloidal silica. In particular, the activated colloidal silica of Example 2 exhibit significantly improved performance in terms of FPAR over the un-activated colloidal silica, even known aluminum-modified colloidal silica.

Examples 3 and 4

Activated colloidal silicas #3 and #4 were prepared by adding 4.36 g of 14.83% diluted sulfuric acid into 100 g of colloidal silica (N8699, available from Nalco Chemical Company) to afford a mixture having a pH value of 9.04, and then aging the mixture at room temperature for 39 and 43 minutes, respectively. The summary of the activated colloidal silicas #3 and #4 are shown in Table 3 below. For comparison, the summary of Colloidal Silica NP580 (a silica sol, available from EKA Nobel, AB) and Colloidal Silica N8699 are also given in Table 3.

TABLE 3

|  | Ex. No. | | | |
| --- | --- | --- | --- | --- |
|  | — | — | 3 | 4 |
| Colloidal Silica | NP580 | N8699 | #3 | #4 |
| Specific Surface Area, $m^2/g$ | 1090 | 780 | / | / |
| pH | 10.84 | 10.69 | 9.04 | 9.04 |
| $SiO_2$ % | 15.35 | 14.73 | 14.08 | 14.08 |
| S-value, % | 35.1 | 32.9 | 17.2 | 15.9 |

Retention performance of these colloidal silicas was evaluated on DFR-05, available from GB Co., Germany as follows. A stuff for culture papers consisting of, based on pulp, 20 wt % long fiber and 80 wt % short fiber was diluted with tap water to form a furnish having a consistency of about 1%, a pH value of 6.62, a conductivity of 463 µs/cm, and an anionic trash of 58.1 µeq/L. To the furnish was added with 15 wt %, calculated as dry weight on dry fibers weight, of ground calcium carbonate as filler. To the furnish were also added with a cationic starch (Cato305 from National Starch) in an amount of 10 kg/ton, a cPAM (N61067 from Nalco Chemical Company) in an amount of 0.07 kg (effective dry weight)/ton, and the individual colloidal silica in a specified amount. The addition sequence we as follows:

| Sequence Time (sec) | Action |
| --- | --- |
| 0 | Add furnish |
| 5 | Add cationic starch |
| 10 | Add filler |
| 20 | Add cPAM |
| 25 | Add colloidal silica. |

The results are shown in Table 4 below.

TABLE 4

| Amount of colloidal silica | First pass ash retention (FPAR) (%) | | | |
| --- | --- | --- | --- | --- |
| (ppm per active) | NP580 | N8699 | #3 | #4 |
| 0 | 46.5 | 46.5 | 46.5 | 46.5 |
| 250 | 53.5 | 55 | 56.4 | 56.8 |
| 500 | 59.1 | 57.4 | 63.1 | 63.4 |

From the data given in Table 4 it can be seen that the activated colloidal silicas of Examples 3 and 4 exhibit improved performance in terms of FPAR over the unactivated colloidal silica and the commercial product, NP580.

Example 5

Activated colloidal silicas #5 and #6 were prepared by adding 18.77 g of 5% diluted sulfuric acid into 100 g of colloidal silica having a $SiO_2$ content of 14.88% (N8699, available from Nalco Chemical Company) to afford a mixture having a pH value of 9.00, and then aging the mixture at room temperature for 60 and 120 minutes, respectively. Samples of the activated colloidal silicas #5 and #6 were measured for their S-values and the results are shown in Table 5 below.

TABLE 5

| N8699 (14.88%)--5.0% $H_2SO_4$ to pH = 9.00 | | |
| --- | --- | --- |
| Colloidal Silica | Activation Time (minutes) | S-value (%) |
| N8699 | 0 | 36.2 |
| #5 | 60 | 26.9 |
| #6 | 120 | 21.3 |

Example 6

Activated colloidal silicas #7 and #8 were prepared by adding 4.95 g of 14.70% diluted sulfuric acid into 100 g of colloidal silica having a $SiO_2$ content of 14.61% (N8699, available from Nalco Chemical Company) to afford a mixture having a pH value of 8.79, and then aging the mixture at room temperature for 20 and 28 minutes, respectively. Samples of the activated colloidal silicas #7 and #8 were measured for their S-values and the results are shown in Table 6 below.

Similarly, activated colloidal silicas #9 and #10 were prepared by adding 4.62 g of 14.70% diluted sulfuric acid into 100 g of colloidal silica having a $SiO_2$ content of 14.61% (N8699, available from Nalco Chemical Company) to afford a mixture having a pH value of 9.01, and then aging the mixture at room temperature for 30 and 35 minutes, respectively. Samples of the activated colloidal silicas #9 and #10 were measured for their S-values and the results are also shown in Table 6 below.

Similarly, activated colloidal silicas #11 and #12 were prepared by adding 4.27 g of 14.70% diluted sulfuric acid into 100 g of colloidal silica having a $SiO_2$ content of 14.61% (N8699, available from Nalco Chemical Company) to afford a mixture having a pH value of 9.21, and then aging the mixture at room temperature for 60 and 90 minutes, respectively. Samples of the activated colloidal silicas #11 and #12 were measured for their S-values and the results are also shown in Table 6 below.

TABLE 6

| Colloidal Silica | Activation Time (minutes) | S-value (%) |
| --- | --- | --- |
| N8699 | 0 | 32.9 |
| N8699 (14.61%) - 14.70% $H_2SO_4$ to pH 8.79 | | |
| #7 | 20 | 16.4 |
| #8 | 28 | 11.9 |
| N8699 (14.61%) - 14.70% $H_2SO_4$ to pH 9.01 | | |
| #9 | 30 | 17.7 |
| #10 | 35 | 13.0 |
| N8699 (14.61%) - 14.70% $H_2SO_4$ to pH 9.21 | | |
| #11 | 60 | 18.7 |
| #12 | 90 | 13.8 |

Example 7

Activated colloidal silicas #13 to #16 were prepared by adding 4.33 g of 14.70% diluted sulfuric acid into 100 g of colloidal silica having a $SiO_2$ content of 14.61% (N8699, available from Nalco Chemical Company) to afford a mixture having a pH value of 9.20 and a conductivity of 13.52 ms/cm, and then aging the mixture at room temperature for 30, 45, 60, and 75 minutes, respectively. Samples of the activated colloidal silicas #13 to #16 were measured for their S-values and the results are shown in Table 7 below.

In addition, activated colloidal silicas #17 to #19 were prepared by adding 4.30 g of 14.70% diluted sulfuric acid into 100 g of colloidal silica having a $SiO_2$ content of 14.61% (N8699, available from Nalco Chemical Company) to afford a mixture having a pH value of 9.20, adjusting the conductivity of the mixture with saturated aqueous sodium chloride solution to 14.18 ms/cm, and then aging the mixture at room temperature for 30, 45, and 60 minutes, respectively. Samples of the activated colloidal silicas #17 to #19 were measured for their S-values and the results are also shown in Table 7 below.

In addition, activated colloidal silicas #20 to #23 were prepared by adding 4.30 g of 14.70% diluted sulfuric acid into 100 g of colloidal silica having a $SiO_2$ content of 14.61% (N8699, available from Nalco Chemical Company) to afford a mixture having a pH value of 9.20, adjusting the conductivity of the mixture with saturated aqueous sodium chloride solution to 14.64 ms/cm, and then aging the mixture at room temperature for 20, 30, 45, and 52 minutes, respectively. Samples of the activated colloidal silicas #20 to #23 were measured for their S-values and the results are also shown in Table 7 below.

TABLE 7

| Colloidal Silica | Activation Time (minutes) | S-value (%) |
|---|---|---|
| N8699 | 0 | 32.9 |
| N8699 (14.61%) - 14.70% $H_2SO_4$ to pH 9.20, saturated NaCl solution to a conductivity of 13.52 ms/cm | | |
| #13 | 30 | 24.6 |
| #14 | 45 | 21.7 |
| #15 | 60 | 19.0 |
| #16 | 75 | 16.6 |
| N8699 (14.61%) - 14.70% $H_2SO_4$ to pH 9.20, saturated NaCl solution to a conductivity of 14.18 ms/cm | | |
| #17 | 30 | 23.3 |
| #18 | 45 | 19.8 |
| #19 | 60 | 17.4 |
| N8699 (14.61%) - 14.70% $H_2SO_4$ to pH 9.20, saturated NaCl solution to a conductivity of 14.64 ms/cm | | |
| #20 | 20 | 25.2 |
| #21 | 30 | 22.3 |
| #22 | 45 | 18.5 |
| #23 | 52 | 17.3 |

Example 8

Activated colloidal silicas #24 and #25 were prepared by adding 1.70 g of citric acid into 100 g of colloidal silica having a $SiO_2$ content of 14.88% (N8699, available from Nalco Chemical Company) to afford a mixture having a pH value of 9.00, and then aging the mixture at room temperature for 60 and 90 minutes, respectively. Samples of the activated colloidal silicas #24 and #25 were measured for their S-values and the results are shown in Table 8 below.

TABLE 8

N8699 (14.88%) - citric acid to pH 9.00

| Colloidal Silica | Activation Time (minutes) | S-value (%) |
|---|---|---|
| N8699 | 0 | 34.4 |
| #24 | 60 | 20.3 |
| #25 | 90 | 16.5 |

Example 9

Activated colloidal silicas #26 and #27 were prepared by adding 13.12 g of 10% aqueous sodium chloride solution into 100 g of colloidal silica having a $SiO_2$ content of 14.88% and a conductivity of 6.47 ms/cm (N8699, available from Nalco Chemical Company) to afford a mixture having a conductivity of 19.13 ms/cm, and then aging the mixture at room temperature for 90 and 150 minutes, respectively. Samples of the activated colloidal silicas #26 and #27 were measured for their S-values and the results are shown in Table 9 below.

TABLE 9

N8699 (14.88%) - 10% sodium chloride solution to a conductivity of 19.13 ms/cm

| Colloidal Silica | Activation Time (minutes) | S-value (%) |
|---|---|---|
| N8699 | 0 | 34.4 |
| #26 | 90 | 22.7 |
| #27 | 150 | 19.7 |

Example 10

Activated colloidal silicas #28 and #29 were prepared by adding 1.5 g of sodium bicarbonate into 100 g of colloidal silica having a $SiO_2$ content of 14.88%, a pH value of 10.63, and a conductivity of 6.47 ms/cm (N8699, available from Nalco Chemical Company) to afford a mixture having a pH value of 10.26 and a conductivity of 12.54 ms/cm, and then aging the mixture at room temperature for 90 and 150 minutes, respectively. Samples of the activated colloidal silicas #28 and #29 were measured for their S-values and the results are shown in Table 10 below.

TABLE 10

N8699 (14.88%) - sodium bicarbonate to pH 10.26 and a conductivity 12.54 ms/cm

| Colloidal Silica | Activation Time (minutes) | S-value (%) |
|---|---|---|
| N8699 | 0 | 34.4 |
| #28 | 90 | 25.2 |
| #29 | 150 | 21.2 |

Example 11

Activated colloidal silicas #30 and #31 were prepared by adding 18.13 g of 10% aqueous potassium chloride solution into 100 g of colloidal silica having a $SiO_2$ content of 14.38% and a conductivity of 5.72 ms/cm (N8699, available from Nalco Chemical Company) to afford a mixture having a conductivity of 17.51 ms/cm, and then aging the mixture at room temperature for 90 and 150 minutes, respectively. Samples of the activated colloidal silicas #30 and #31 were measured for their S-values and the results are shown in Table 11 below.

TABLE 11

N8699 (14.38%) - 10% potassium chloride solution to a conductivity of 17.5 ms/cm

| Colloidal Silica | Activation Time (minutes) | S-value (%) |
|---|---|---|
| N8699 | 0 | 40.0 |
| #30 | 90 | 25.6 |
| #31 | 150 | 19.7 |

Example 12

To 100 g of colloidal silica having a $SiO_2$ content of 14.88% (N8699, available from Nalco Chemical Company) was added with 18.77 g of 5% diluted sulfuric acid to afford a mixture having a pH value of 9.00. The mixture was then allowed to age at room temperature, and samples were taken at specified time and measured for their Brookfield viscosities. The results are shown in Table 12 below.

TABLE 12

N8699 (14.88%) - 5% $H_2SO_4$ to pH 9.00

| Activation Time (minutes) | Brookfield Viscosity (cps) |
|---|---|
| 0 | 4.7 |
| 30 | 5.9 |
| 60 | 7.4 |
| 120 | 14.5 |
| 240 | Gelled |

Example 13

To 100 g of colloidal silica having a $SiO_2$ content of 14.88% (N8699, available from Nalco Chemical Company) was added with 1.71 g of citric acid to afford a mixture having a pH value of 9.00. The mixture was then allowed to age at room temperature, and samples were taken at specified time and measured for their Brookfield viscosities. The results are shown in Table 13 below.

TABLE 13

N8699 (14.88%) - citric acid to pH 9.00

| Activation Time (minutes) | Brookfield Viscosity (cps) |
|---|---|
| 0 | 6.4 |
| 30 | 11.3 |
| 60 | 34.9 |
| 90 | 966.0 |
| 120 | Gelled |

Example 14

100 g of colloidal silica having a $SiO_2$ content of 14.88% (N8699, available from Nalco Chemical Company) was mixed with 1.5 g of sodium bicarbonate to afford a mixture having a pH value of 10.26. The mixture was then allowed to age at room temperature, and samples were taken at specified time and measured for their Brookfield viscosities. The results are shown in Table 14 below.

TABLE 14

N8699 (14.88%) - sodium bicarbonate to pH 10.26

| Activation Time (minutes) | Brookfield Viscosity (cps) |
|---|---|
| 0 | 5.9 |
| 30 | 7.0 |
| 60 | 10.9 |
| 90 | 24.3 |
| 120 | 112.4 |
| 150 | >1000 |

Example 15

100 g of colloidal silica having a $SiO_2$ content of 14.88% and a conductivity of 6.47 ms/cm (N8699, available from Nalco Chemical Company) was mixed with 13.12 g of 10% aqueous sodium chloride solution to afford a mixture having a conductivity of 19.13 ms/cm. The mixture was then allowed to age at room temperature, and samples were taken at specified time and measured for their Brookfield viscosities. The results are shown in Table 15 below.

TABLE 15

N8699 (14.88%) - 10% sodium chloride solution to a conductivity of 19.13 ms/cm

| Activation Time (minutes) | Brookfield Viscosity (cps) |
|---|---|
| 0 | 6.0 |
| 30 | 8.0 |
| 60 | 9.9 |
| 90 | 12.0 |
| 120 | 18.7 |
| 150 | 34.1 |
| 180 | 98.6 |

Example 16

100 g of colloidal silica having a $SiO_2$ content of 9.74% and was mixed with 4.25 g of 15% sulfuric acid to afford a mixture having a pH value of 8.00. The mixture was then allowed to age at room temperature, and samples were taken at specified time and measured for their Brookfield viscosities and S-values. The results are shown in Table 16 below.

TABLE 16

Colloidal silica (9.74%) - 15% $H_2SO_4$ to pH 8.00

| Activation Time (minutes) | Brookfield Viscosity (cps) | S-value |
|---|---|---|
| 0 | 2.77 | — |
| 10 | 4.04 | — |
| 20 | 5.26 | — |
| 30 | 6.67 | — |
| 40 | 8.80 | — |
| 50 | 11.1 | 16.9 |
| 60 | 14.8 | 16.0 |
| 70 | 22.1 | 15.5 |
| 79 | 31.6 | 14.7 |

Example 17

100 g of colloidal silica having a $SiO_2$ content of 7.31% and was mixed with 4.06 g of 15% sulfuric acid to afford a mixture having a pH value of 5.80. The mixture was then allowed to age at room temperature, and samples were taken at specified time and measured for their Brookfield viscosities and S-values. The results are shown in Table 17 below.

TABLE 17

Colloidal silica (7.31%) - 15% $H_2SO_4$ to pH 5.80

| Activation Time (minutes) | Brookfield Viscosity (cps) | S-value |
|---|---|---|
| 0 | 2.08 | — |
| 5 | 2.50 | — |
| 8 | 3.00 | — |
| 9 | 3.30 | 20.5 |
| 10 | 3.67 | — |
| 11 | 4.08 | — |
| 13 | 5.00 | 16.0 |
| 15 | 7.00 | — |
| 16 | 10.0 | — |
| 19 | 20.0 | 11.9 |
| 20 | 50.0 | — |

Example 18

100 g of Al-modified colloidal silica having a $SiO_2$ content of 8.15% (32K, available from EKA Nobel, AB) was mixed with 10.87 g of 15% sulfuric acid to afford a mixture having a pH value of 1.40. The mixture was then allowed to age at room temperature, and samples were taken at specified time and measured for their Brookfield viscosities. The results are shown in Table 18 below.

TABLE 18

32K (8.15%) - 15% $H_2SO_4$ to pH 1.40

| Activation Time (days) | Brookfield Viscosity (cps) |
|---|---|
| 0 | 4.09 |
| 2 | 8.38 |
| 6 | gelled |

Example 19

100 g of colloidal silica having a $SiO_2$ content of 14.85% (N8699, available from Nalco Chemical Company) was mixed with 4.60 g of 14.7% sulfuric acid to afford a mixture having a pH value of 9.00. The mixture was divided into three portions, and the three portions were then allowed to age at 5° C., 20° C., and 35° C., respectively. Samples were taken at specified time and measured for their Brookfield viscosities. The results are shown in Table 19 below.

TABLE 19

N8699 (14.85%) - 15% $H_2SO_4$ to pH 9.00

| Activation Time (min) | Brookfield Viscosity (cps) | | |
|---|---|---|---|
| | Activation @5° C. | Activation @20° C. | Activation @35° C. |
| 0 | 4.07 | 4.07 | 4.07 |
| 20 | 12.80 | 12.40 | 28.59 |
| 25 | 14.45 | 44.30 | 72.08 |
| 26 | 14.80 | 51.00 | 115.98 |
| 27 | 15.15 | 61.70 | 143.97 |
| 28 | 15.55 | 73.80 | 213.95 |
| 32 | 17.20 | 95.60 | 887.81 |

Examples 20 and 21

Examples 20 and 21 were conducted by the apparatus as shown in FIG. 3. Activated colloidal silicas #1 and #2 were prepared by adding 13 kg of 50% sulfuric acid into one ton of colloidal silica (N8699, available from Nalco Chemical Company) to afford a mixture having a pH value of 9.0, and then aging the mixture at room temperature for 30 and 60 minutes, respectively. Samples of the activated colloidal silicas #1 and #2 were analyzed and the results are shown in Table 1 below. For comparison, the results for Colloidal Silica 32K (an aluminum-modified silica sol, available from EKA Nobel, AB) and Colloidal Silica N8699 are also listed.

TABLE 20

| Ex. No. | — | — | 20 | 21 |
|---|---|---|---|---|
| Colloidal Silica | 32K | N8699 | #1 | #2 |
| Specific Surface Area, $m^2/g$ | 633 | 780 | / | / |
| pH | 9.49 | 10.77 | 9.00 | 9.00 |
| $SiO_2$ % | 8.48 | 14.90 | 14.2 | 14.2 |
| S-value, % | 24.1 | 35.4 | 20.4 | 16.7 |

Retention performance of these colloidal silicas was evaluated on DFR-05, available from GB Co., Germany as follows. A stuff for culture papers consisting of, based on pulp, 20 wt % long fiber, 60 wt % short fiber, and 20 wt % chemical-mechanical pulp fiber was diluted with whitewater to form a furnish having a consistency of about 1%, a pH value of 7.84, a conductivity of 1270 μs/cm, and an anionic trash of 123.2 μeq/L. To the furnish was added with 30 wt %, calculated as dry weight on dry fibers weight, of precipitated calcium carbonate as filler. To the furnish were also added with a cationic starch (Cato305 from National Starch) in an amount of 10 kg/ton, a cationic polyacrylamide (cPAM) (N61067 from Nalco Chemical Company) in an amount of 0.125 kg (effective dry weight)/ton, and the individual colloidal silica in a specified amount. All given dosages of the additives in this and following examples are calculated as dry on dry fibers and optional fillers. The addition sequence we as follows:

| Sequence Time (sec) | Action |
|---|---|
| 0 | Add furnish |
| 5 | Add cationic starch |
| 10 | Add filler |
| 20 | Add cPAM |
| 25 | Add colloidal silica. |

The results are shown in Table 21 below.

TABLE 21

| Amount of colloidal silica | First pass ash retention (FPAR) (%) | | | |
|---|---|---|---|---|
| (ppm per active) | 32K | N8699 | #1 | #2 |
| 0 | 33.6 | 33.6 | 33.6 | 33.6 |
| 250 | 41.4 | 39.1 | 39.8 | 43.2 |
| 500 | 50.1 | 48.3 | 49.7 | 54.9 |
| 750 | 58.3 | 55.5 | 55.6 | 66.5 |

From the data given in Table 21 it can be seen that the activated colloidal silicas of Examples 1 and 2 exhibit improved performance in terms of FPAR over the un-activated colloidal silica. In particular, the activated colloidal silica of Example 21 exhibit significantly improved performance in terms of FPAR over the un-activated colloidal silica, even known aluminum-modified colloidal silica.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method of activating colloidal silica for use in papermaking comprising:
    (a) contacting an unmodified colloidal silica feedstock with an activating agent selected from the group consisting of an inorganic acid, an organic acid, salts of sodium or potassium, and mixtures thereof for a period of time sufficient to convert the colloidal silica feedstock into the activated colloidal silica, wherein the activated colloidal silica has an S-value that is at least 10% lower than the colloidal silica feedstock and a shelf-life of less than 30 days; and
    (b) adding the activated colloidal silica to papermaking furnish.

2. The method of claim 1, wherein the activating agent is used in an amount so as to afford an activation reaction mixture having a pH value of from 7.5 to 10.5.

3. The method of claim 1, wherein the activating agent is used in an amount so as to afford an activation reaction mixture having a pH value of from 0.5 to 3.5.

4. The method of claim 1, wherein the activating agent is at least one salt, and the activating agent is used in an amount so as to afford an activation reaction mixture having a conductivity of from 0.1 mS/cm to 100 mS/cm greater than the conductivity of the colloidal silica feedstock.

5. The method of claim 4, further comprising measuring the conductivity with a sensor.

6. The method of claim 5, further comprising adding a terminator source if the conductivity exceeds a predetermined threshold.

7. The method of claim 6, wherein the terminator source is selected from the group consisting of water, hydroxide salts, aluminum salts, and mixtures thereof.

8. The method of claim 1, wherein the activating agent is selected from the group consisting of sulfuric acid, hydrochloric acid, nitric acid, phosphoric acid, carbonic acid, formic acid, acetic acid, propionic acid, butyric acid, citric acid, oxalic acid, malonic acid, maleic acid, fumaric acid, benzoic acid, benzene sulfonic acid, p-toluene sulfonic acid, sodium bicarbonate, potassium bicarbonate, monosodium phosphate, monopotassium phosphate, disodium phosphate, dipotassium phosphate, sodium chloride, potassium chloride, sodium sulfate, potassium sulfate, sodium nitrate, potassium nitrate, sodium chlorate, and potassium chlorate and mixtures thereof.

9. The method of claim 1, wherein the contacting lasted for a period of time in the range of from 5 minutes to 12 hours.

10. The method of claim 1, wherein the colloidal silica feedstock has a specific surface area of from 400 $m^2/g$ to 1100 $m^2/g$, an S-value of from 15 to 50%, and a solids content of from 5 to 20 wt %.

11. The method of claim 1, wherein the activated colloidal silica is added to the furnish in a concentration of from about 0.0001 to about 1.25 percent by weight based on the dry weight of the fibers in the furnish and the activated colloidal silicate calculated as $SiO_2$.

12. The method of claim 1, wherein the activated colloidal silica has a shelf-life of 1 to 7 days.

13. The method of claim 1, wherein the activated colloidal silica is at least 20% more effective as a drainage aid compared to unactivated colloidal silica.

14. The method of claim 1, wherein the activated colloidal silica has an S-value that is at least 20% lower than the S-value of the colloidal silica feedstock.

* * * * *

UNITED STATES PATENT AND TRADEMARK OFFICE
CERTIFICATE OF CORRECTION

PATENT NO. : 9,975,781 B2  
APPLICATION NO. : 15/105801  
DATED : May 22, 2018  
INVENTOR(S) : Bai et al.

Page 1 of 1

It is certified that error appears in the above-identified patent and that said Letters Patent is hereby corrected as shown below:

On the Title Page

Notice, Line 3: "by 0 days. days." should read --by 0 days.--

Signed and Sealed this  
Twenty-first Day of April, 2020

Andrei Iancu  
*Director of the United States Patent and Trademark Office*